(12) United States Patent
Yue et al.

(10) Patent No.: US 6,581,085 B1
(45) Date of Patent: Jun. 17, 2003

(54) APPROXIMATION CIRCUIT AND METHOD

(75) Inventors: Lordson L. Yue, Foster City, CA (US); Parin B. Dalal, Milpitas, CA (US); Avery Wang, Redwood City, CA (US)

(73) Assignee: ATI International SrL, Christchurch (BB)

( * ) Notice: Subject to any disclaimer, the term of this patent is extended or adjusted under 35 U.S.C. 154(b) by 0 days.

(21) Appl. No.: 09/310,184

(22) Filed: May 12, 1999

(51) Int. Cl.[7] .................................................. G06F 7/38
(52) U.S. Cl. ...................................................... 708/502
(58) Field of Search ................................ 708/502, 495, 708/650, 653, 272

(56) References Cited

U.S. PATENT DOCUMENTS 4,482,975 A * 11/1984 King et al. .................. 708/272
5,179,659 A * 1/1993 Lien et al. ................... 708/650
5,274,580 A * 12/1993 Keryvel et al. .............. 708/653
5,963,460 A * 10/1999 Rarick ......................... 708/495

* cited by examiner

*Primary Examiner*—Tan V. Mai
(74) *Attorney, Agent, or Firm*—Vedder, Price, Kaufman & Kammholz (57) ABSTRACT

An approximation circuit approximates a function f(x) of an input value "x" by adding at least the first two terms in a Taylor series (i.e., f(a) and f'(a)(x−a)) where "a" is a number reasonably close to value "x". The first term is generated by a first look-up table which receives the approximation value "a". The first look-up table generates a function f(a) of the approximation value "a". The second look-up table generates a first derivative f'(a) of the function f(a). A first multiplier then multiplies the first derivative f'(a) by a difference (x−a) between input value "x" and approximation value "a" to generate a product f'(a)(x−a). The approximation circuit can approximate the function f(x) by adding the third term of the Taylor series, $(½)f''(a)(x−a)^2$.

12 Claims, 5 Drawing Sheets

```
0x02000001, // 0x00    0x01970e52, // 0x21    0x01539097, // 0x41    0x0123456a, // 0x61
0x01fc07f2, // 0x01    0x01948b12, // 0x22    0x0151d081, // 0x42    0x0121fb7a, // 0x62
0x01f81f84, // 0x02    0x01920fb7, // 0x23    0x01501503, // 0x43    0x0120b473, // 0x63
0x01f4465c, // 0x03    0x018f9c1b, // 0x24    0x014e5e0d, // 0x44    0x011f704a, // 0x64
0x01f07c21, // 0x04    0x018d301b, // 0x25    0x014cab8b, // 0x45    0x011e2ef6, // 0x65
0x01ecc07d, // 0x05    0x018acb93, // 0x26    0x014afd6c, // 0x46    0x011cf06d, // 0x66
0x01e9131c, // 0x06    0x01886e61, // 0x27    0x014953a0, // 0x47    0x011bb4a6, // 0x67
0x01e573ae, // 0x07    0x01861864, // 0x28    0x0147ae17, // 0x48    0x011a7b98, // 0x68
0x01e1e1e4, // 0x08    0x0183c97a, // 0x29    0x01460cbf, // 0x49    0x0119453a, // 0x69
0x01de5d70, // 0x09    0x01818184, // 0x2a    0x01446f89, // 0x4a    0x01181183, // 0x6a
0x01dae609, // 0x0a    0x017f4062, // 0x2b    0x0142d665, // 0x4b    0x0116e06b, // 0x6b
0x01d77b67, // 0x0b    0x017d05f6, // 0x2c    0x01414143, // 0x4c    0x0115b1e8, // 0x6c
0x01d41d44, // 0x0c    0x017ad223, // 0x2d    0x013fb016, // 0x4d    0x011485f3, // 0x6d
0x01d0cb5b, // 0x0d    0x0178a4ca, // 0x2e    0x013e22ce, // 0x4e    0x01135c83, // 0x6e
0x01cd856b, // 0x0e    0x01767dd0, // 0x2f    0x013c995c, // 0x4f    0x01123591, // 0x6f
0x01ca4b32, // 0x0f    0x01745d19, // 0x30    0x013b13b3, // 0x50    0x01111113, // 0x70
0x01c71c74, // 0x10    0x01724828a, // 0x31   0x013991c5, // 0x51    0x0110fef03, // 0x71
0x01c3f8f2, // 0x11    0x01702e08, // 0x32    0x01381383, // 0x52    0x0110ecf59, // 0x72
0x01c0e072, // 0x12    0x016e1f79, // 0x33    0x013698e1, // 0x53    0x0110db20d, // 0x73
0x01bdd2bb, // 0x13    0x016c16c4, // 0x34    0x013521d2, // 0x54    0x010c9717, // 0x74
0x01bacf93, // 0x14    0x016a13cf, // 0x35    0x0133ae48, // 0x55    0x010b7e71, // 0x75
0x01b7d6c6, // 0x15    0x01681684, // 0x36    0x01323e37, // 0x56    0x010a6813, // 0x76
0x01b4e81d, // 0x16    0x01661ec9, // 0x37    0x0130d192, // 0x57    0x010953f6, // 0x77
0x01b20366, // 0x17    0x01642c88, // 0x38    0x012f684e, // 0x58    0x010842213, // 0x78
0x01af286e, // 0x18    0x01623faa, // 0x39    0x012e025e, // 0x59    0x010073263, // 0x79
0x01ac5704, // 0x19    0x01605818, // 0x3a    0x012c9fb7, // 0x5a    0x010624df, // 0x7a
0x01a98ef8, // 0x1a    0x015e75be, // 0x3b    0x012b404d, // 0x5b    0x010051982, // 0x7b
0x01a6d01d, // 0x1b    0x015c9885, // 0x3c    0x0129e415, // 0x5c    0x010041043, // 0x7c
0x01a41a44, // 0x1c    0x015ac059, // 0x3d    0x01288b03, // 0x5d    0x010309d, // 0x7d
0x01a16d42, // 0x1d    0x0158ed25, // 0x3e    0x0127350e, // 0x5e    0x010204a, // 0x7e
0x019ec8eb, // 0x1e    0x01571ed6, // 0x3f    0x0125e229, // 0x5f    0x01010103, // 0x7f
0x019c2d17, // 0x1f    0x01555557, // 0x40    0x0124924b, // 0x60
0x0199999c, // 0x20
```

FIG. 3

| | | | | | | |
|---|---|---|---|---|---|---|---|
| 0xfffc000a, // | 0x00 | 0xfffd70a7, // | 0x20 | 0xfffe38e8, // | 0x40 | 0xfffeb1a4, // | 0x60 |
| 0xfffc0fda, // | 0x01 | 0xfffd78c4, // | 0x21 | 0xfffe3d99, // | 0x41 | 0xfffeb499, // | 0x61 |
| 0xfffc1f4c, // | 0x02 | 0xfffd80bd, // | 0x22 | 0xfffe423b, // | 0x42 | 0xfffeb789, // | 0x62 |
| 0xfffc2e65, // | 0x03 | 0xfffd888d, // | 0x23 | 0xfffe46cd, // | 0x43 | 0xfffeba6b, // | 0x63 |
| 0xfffc3d28, // | 0x04 | 0xfffd903c, // | 0x24 | 0xfffe4b47, // | 0x44 | 0xfffebd44, // | 0x64 |
| 0xfffc4b95, // | 0x05 | 0xfffd97c5, // | 0x25 | 0xfffe4fb3, // | 0x45 | 0xfffec014, // | 0x65 |
| 0xfffc59b2, // | 0x06 | 0xfffd9f2d, // | 0x26 | 0xfffe5410, // | 0x46 | 0xfffec2db, // | 0x66 |
| 0xfffc677b, // | 0x07 | 0xfffda672, // | 0x27 | 0xfffe585b, // | 0x47 | 0xfffec599, // | 0x67 |
| 0xfffc74f5, // | 0x08 | 0xfffdad93, // | 0x28 | 0xfffe5c92, // | 0x48 | 0xfffec84d, // | 0x68 |
| 0xfffc8228, // | 0x09 | 0xfffdb498, // | 0x29 | 0xfffe60bc, // | 0x49 | 0xfffecaf9, // | 0x69 |
| 0xfffc8f10, // | 0x0a | 0xfffdbb7b, // | 0x2a | 0xfffe64d5, // | 0x4a | 0xfffecd9c, // | 0x6a |
| 0xfffc9bb1, // | 0x0b | 0xfffdc242, // | 0x2b | 0xfffe68e0, // | 0x4b | 0xfffed034, // | 0x6b |
| 0xfffca80b, // | 0x0c | 0xfffdc8e9, // | 0x2c | 0xfffe6cdf, // | 0x4c | 0xfffed2c7, // | 0x6c |
| 0xfffcb425, // | 0x0d | 0xfffdcf71, // | 0x2d | 0xfffe70ca, // | 0x4d | 0xfffed550, // | 0x6d |
| 0xfffcbffb, // | 0x0e | 0xfffdd5e0, // | 0x2e | 0xfffe74a8, // | 0x4e | 0xfffed7d2, // | 0x6e |
| 0xfffccb97, // | 0x0f | 0xfffddc31, // | 0x2f | 0xfffe7879, // | 0x4f | 0xfffeda49, // | 0x6f |
| 0xfffcd6ef, // | 0x10 | 0xfffde265, // | 0x30 | 0xfffe7c3a, // | 0x50 | 0xfffedcbd, // | 0x70 |
| 0xfffce20f, // | 0x11 | 0xfffde87e, // | 0x31 | 0xfffe7fec, // | 0x51 | 0xfffedf26, // | 0x71 |
| 0xfffcecf5, // | 0x12 | 0xfffdee7e, // | 0x32 | 0xfffe8394, // | 0x52 | 0xfffee187, // | 0x72 |
| 0xfffcf79e, // | 0x13 | 0xfffdf464, // | 0x33 | 0xfffe872d, // | 0x53 | 0xfffee3e0, // | 0x73 |
| 0xfffd0216, // | 0x14 | 0xfffdfa30, // | 0x34 | 0xfffe8ab6, // | 0x54 | 0xfffee635, // | 0x74 |
| 0xfffd0c53, // | 0x15 | 0xfffdffe7, // | 0x35 | 0xfffe8e36, // | 0x55 | 0xfffee880, // | 0x75 |
| 0xfffd165f, // | 0x16 | 0xfffe0581, // | 0x36 | 0xfffe91a8, // | 0x56 | 0xfffeeac4, // | 0x76 |
| 0xfffd2036, // | 0x17 | 0xfffe0b08, // | 0x37 | 0xfffe9510, // | 0x57 | 0xfffeed01, // | 0x77 |
| 0xfffd29db, // | 0x18 | 0xfffe1075, // | 0x38 | 0xfffe9869, // | 0x58 | 0xfffeef37, // | 0x78 |
| 0xfffd3350, // | 0x19 | 0xfffe15cd, // | 0x39 | 0xfffe9bb9, // | 0x59 | 0xfffef168, // | 0x79 |
| 0xfffd3c99, // | 0x1a | 0xfffe1b11, // | 0x3a | 0xfffe9efb, // | 0x5a | 0xfffef393, // | 0x7a |
| 0xfffd45b0, // | 0x1b | 0xfffe203a, // | 0x3b | 0xfffea232, // | 0x5b | 0xfffef5b3, // | 0x7b |
| 0xfffd4e9d, // | 0x1c | 0xfffe2553, // | 0x3c | 0xfffea55e, // | 0x5c | 0xfffef7d1, // | 0x7c |
| 0xfffd575e, // | 0x1d | 0xfffe2a55, // | 0x3d | 0xfffea881, // | 0x5d | 0xfffef9e8, // | 0x7d |
| 0xfffd5ff7, // | 0x1e | 0xfffe2f45, // | 0x3e | 0xfffeab95, // | 0x5e | 0xfffefbf5, // | 0x7e |
| 0xfffd6863, // | 0x1f | 0xfffe341e, // | 0x3f | 0xfffeaea3, // | 0x5f | 0xfffefdfe, // | 0x7f |

FIG. 4

```
0xfd0, // 0x00    0x81e, // 0x20    0x4b0, // 0x40    0x2f6, // 0x60
0xf72, // 0x01    0x7f9, // 0x21    0x4a2, // 0x41    0x2ef, // 0x61
0xf1a, // 0x02    0x7d0, // 0x22    0x490, // 0x42    0x2e0, // 0x62
0xec2, // 0x03    0x7af, // 0x23    0x479, // 0x43    0x2d8, // 0x63
0xe6a, // 0x04    0x789, // 0x24    0x46e, // 0x44    0x2d0, // 0x64
0xe17, // 0x05    0x767, // 0x25    0x45d, // 0x45    0x2c6, // 0x65
0xdc2, // 0x06    0x743, // 0x26    0x449, // 0x46    0x2bd, // 0x66
0xd77, // 0x07    0x722, // 0x27    0x438, // 0x47    0x2b3, // 0x67
0xd30, // 0x08    0x707, // 0x28    0x42c, // 0x48    0x2ab, // 0x68
0xce4, // 0x09    0x6e4, // 0x29    0x41c, // 0x49    0x2a1, // 0x69
0xc9e, // 0x0a    0x6c7, // 0x2a    0x40e, // 0x4a    0x298, // 0x6a
0xc59, // 0x0b    0x6a5, // 0x2b    0x3fd, // 0x4b    0x293, // 0x6b
0xc1a, // 0x0c    0x688, // 0x2c    0x3e9, // 0x4c    0x288, // 0x6c
0xbd7, // 0x0d    0x66d, // 0x2d    0x3dc, // 0x4d    0x281, // 0x6d
0xb9a, // 0x0e    0x64d, // 0x2e    0x3cd, // 0x4e    0x278, // 0x6e
0xb57, // 0x0f    0x631, // 0x2f    0x3bd, // 0x4f    0x273, // 0x6f
0xb20, // 0x10    0x619, // 0x30    0x3b0, // 0x50    0x267, // 0x70
0xae4, // 0x11    0x601, // 0x31    0x3a5, // 0x51    0x260, // 0x71
0xaa9, // 0x12    0x5e6, // 0x32    0x395, // 0x52    0x25a, // 0x72
0xa76, // 0x13    0x5ce, // 0x33    0x388, // 0x53    0x255, // 0x73
0xa3b, // 0x14    0x5b7, // 0x34    0x380, // 0x54    0x24a, // 0x74
0xa0a, // 0x15    0x59c, // 0x35    0x372, // 0x55    0x244, // 0x75
0x9d6, // 0x16    0x589, // 0x36    0x367, // 0x56    0x23e, // 0x76
0x9a5, // 0x17    0x56e, // 0x37    0x358, // 0x57    0x238, // 0x77
0x977, // 0x18    0x55a, // 0x38    0x34f, // 0x58    0x232, // 0x78
0x94a, // 0x19    0x543, // 0x39    0x340, // 0x59    0x229, // 0x79
0x918, // 0x1a    0x52a, // 0x3a    0x336, // 0x5a    0x21f, // 0x7a
0x8ef, // 0x1b    0x51b, // 0x3b    0x32c, // 0x5b    0x21d, // 0x7b
0x8c3, // 0x1c    0x502, // 0x3c    0x321, // 0x5c    0x213, // 0x7c
0x898, // 0x1d    0x4ef, // 0x3d    0x314, // 0x5d    0x20a, // 0x7d
0x86b, // 0x1e    0x4d8, // 0x3e    0x30d, // 0x5e    0x209, // 0x7e
0x845, // 0x1f    0x4c8, // 0x3f    0x2ff, // 0x5f    0x203, // 0x7f
```

FIG. 5

APPROXIMATION CIRCUIT AND METHOD

BACKGROUND OF THE INVENTION

Functional approximation circuits, such as reciprocal approximation circuits, are known in the art. For example, a division (e.g., in 2D and 3D graphics implementations) is typically implemented using a reciprocal approximation circuit. The resulting reciprocal approximation of the divisor is multiplied with the dividend, thereby emulating the divide operation.

A conventional reciprocal approximation circuit uses an iterative method (e.g., the Newton-Raphson method) based on an initial estimate. Reciprocal approximations are fed back through the circuit until a reciprocal approximation of a desired precision is obtained. This iterative process takes significant time. Thus, a faster circuit and method for approximating, for example, a reciprocal are desired.

SUMMARY OF THE INVENTION

An approximation circuit approximates a function f(x), given an input value "x", by computing and adding at least the first two terms in a Taylor series (i.e., f(a) and f'(a)(x−a)) where "a" is an approximation value reasonably close to the input value "x". For example, "a" may share the most significant bits of input value "x". The values f(a) and f'(a) can be provided by look-up tables. A first look-up table receives the approximation value "a", and provides a function f(a). Similarly, a second look-up table receives the approximation value "a" and provides a first derivative f'(a) of the function f(a). A multiplier then multiplies the value f'(a) represented by the bits generated by the second look-up table by a difference (x−a) between value "x" and value "a". An adder adds the first term represented by the bits generated by the first look-up table and the second term represented by the bits generated by the multiplier to provide an approximation of f(x).

In one embodiment, the third term (i.e., $(\frac{1}{2})f''(a)(x-a)^2$) of the Taylor series is also computed. For example, a third look-up table receives the approximation value "a" and provides a value of one half of the second derivative $(\frac{1}{2})f''(a)$ of the function f(a). A fast squaring circuit receives the difference (x−a) and generates bits representing the square $(x-a)^2$. Another multiplier receives the value $(\frac{1}{2})f''(a)$ and the value $(x-a)^2$ to generate the third term $(\frac{1}{2})f''(a)(x-a)_2$.

Since the terms of the Taylor series are computed in parallel, an adder adds all the terms simultaneously to obtain the approximation. Since no iteration is performed, the approximation circuit of the present invention is faster than conventional approximation circuits.

BRIEF DESCRIPTION OF THE DRAWINGS

FIG. 3 is a diagram of hexadecimal values entered into the left-most look-up table of FIG. 2.

FIG. 4 is a diagram of hexadecimal values entered into the middle look-up table of FIG. 2.

FIG. 5 is a diagram of hexadecimal values entered into the right-most look-up table of FIG. 2.

DETAILED DESCRIPTION OF THE INVENTION

The following description contains references to several drawings which contain the same or similar elements. Throughout this description, the same or similar elements in different drawings are identified with the same reference symbols.

Figure 1:
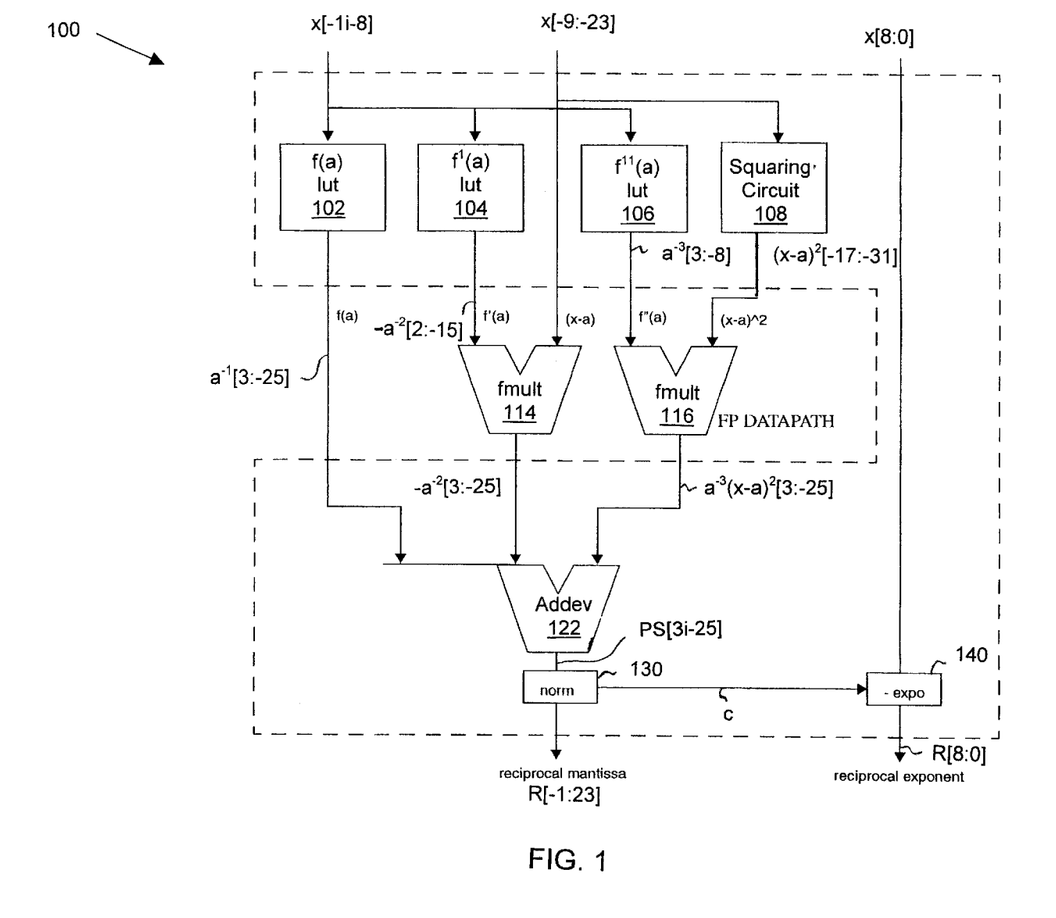
FIG. 1 is a diagram of an approximation circuit according to the present invention.

FIG. 1 schematically shows an approximation circuit 100 according to an embodiment of the present invention. The approximation circuit 100 does not operate iteratively.

The following Equation (1) shows the first three terms in a Taylor series.

$$f(x) \approx f(a) + f'(a)(x-a) + (\tfrac{1}{2})f''(a)(x-a)^2 \qquad (1)$$

where,

"x" is the input value, f(x) is the function of "x" to be approximated,

"a" is an approximation value reasonably close to "x", f(a) is the function of "a", f'(a) is the first derivative of f(a), and f''(a) is the second derivative of f(a).

For example, for reciprocal approximations, f(x) is $x^{-1}$. The Taylor series approximation for $x^{-1}$ is provided in Equation (2).

$$x^{-1} \approx a^{-1} - a^{-2}(x-a) + a^{-3}(x-a)^2 \qquad (2)$$

Approximation circuit 100 calculates these first three terms of the Taylor series in parallel and thus is faster than circuits using the iterative Newton-Raphson approach.

In operation, approximation circuit 100 receives 32-bits x[8:−23] representing an input value "x". Throughout this description, an example of a value represented by bits x[8:−23] is positive $0.698781251907310_{10} \times 2^{108}$.

Bit x[8] (e.g., 0) represents the sign (e.g., non-negative) of the input value "x". Bits x[7:0] (e.g., 011,01100.=$108_{10}$ signed) represent the exponent of the input value "x" in two's complement format. Bits x[1:−23] e.g., 0.10110, 01011,10001,10101,010=$0.69878125190973^{10}$) represent the mantissa of input value "x". The exponent bits x[7:0] are such that bit x[−1] always has a binary one value.

Approximation circuit 100 approximates the reciprocal $x^{-1}$ of input value "x". In this description, for the mantissa, nomenclature [m:n] is used to indicate a series of contiguous bits having weights ranging from $2^m$ down to $2^n$. For example, mantissa x[−1:−23] represents 23 bits ranging from bit x[−1] having weight $2^{-1}$ down to bit x[−23] having weight $2^{-23}$. Also for clarity, commas are placed every five binary bits from the binary decimal point.

Referring to Equation (2), approximation value "a", represented by bits x[−1:−8], has 128 possible values ranging from 0.10000,000 to 0.11111,111 (e.g. 0.10110,010= $0.6953125^{10}$). Value (x−a), represented by bits x[−9:−23], has $2^{15}$ possible values ranging from 0.00000,00000,00000, 00000,000 to 0.00000,00011,11111,11111,111 (e.g., 0.00000,00011,10001,10101,010=$0.003468751907349_{10}$), Referring to FIG. 1, look-up tables 102, 104 and 106 each receives input bits x[−1:−8] (e.g., 0.10110,010). In this embodiment, each of look-up tables (LUTs) 102, 104 and 106 holds 128 entries. A suitable implementation for each of LUTs 102, 104 and 106 is logic circuitry. Another suitable implementation for each of LUTs 102, 104 and 106 is a memory device such as read-only memory (ROM) or random-access memory (RAM).

($a^{-1}$) The First Term of Equation (2)

LUT 102 generates a 26-bit precision unsigned approximation $a^{-1}$[0:−25] of the first term $a^{-1}$ (e.g., 1.01110,00000, 10111,00000,10000≅$1.438202381134^{10}$) where $1 < a^{-1} \leq 2$.

The term $a^{-1}[0:-25]$ is sign extended with zero's to form a 29-bit first term $a^{-1}[3:-25]$ (e.g., 0001.01110,00000,10111, 00000,10000)

[$-a^{-2}$ (x-a)] The Second Term of Equation (2)

LUT 104 generates an 18-bit precision approximation $-a^{-2}[2:-15]$ of $-a^{-2}$ (e.g., 101.11101,11001,11111=$-2.068389892578_{10}$) in two's complement format where $-4<-a^{-2}<-1$. A floating point multiplier 114 receives and multiplies input values $-a^{-2}[2:-15]$ and $x[-9:-23]$ (i.e., x-a) to generate the second term $[-a^{-2}(x-a)][-6:-38]$ (e.g., .*****,11000,10100,11100,10111,11110,11010,110=$-0.007174731385022_{10}$). Asterisks "*" are used to show the weight relationship of bits $[-a^{-2}(x-a)][-6:-37]$ with respect to the binary decimal point. Multiplier 114 discards the 13 least significant bits and sign extends back to a 29-bit value $[-a^{-2}(x-a)][3:-25]$ (e.g., 1111.11111,11000,10100,11100, 10111=$-0.007174760103226^{10}$).

[$a^{-3}(x-a)^2$] The Third Term of Equation (2)

LUT 106 generates a 12-bit precision approximation $a^{-3}[3:-8]$ of $a^{-3}$ (e.g., 0010.11110,011)=$2.94921875_{10}$) where $1 \leq a^{-3} < 8$. A squaring circuit 108 receives and squares the twelve most significant bits of $x[-9:-23]$ (i.e., x-a) to generate $[(x-a)^2][-17:-40]$ (e.g., .***,*,***, *1100,10011,10101,10111,11001=0.0000120 $3058582178_{10}$). The least significant 9-bits of the square $[(x-a)^2][-17:-40]$ are discarded to form $[(x-a)^2][-17:-31]$ (e.g., .***,*,***,*1100,10011,10101,1= $0.0000120303593576_{10}$). A floating point multiplier 116 receives and multiplies input values $a^{-3}[3:-8]$ and $[(x-a)^2][-17:-31]$ to generate the third term $[a^{-3}(x-a)^2][13:-39]$ (e.g., .***,*,001,00101,00110,10000,10001, 0001=$0.00003548016138666_{10}$). The lower 14 bits of this product are discarded and the third term is sign extended to 29-bits to form $[a^{-3}(x-a)^2][3:-25]$ (e.g., 0000.00000,00000, 00001,00101,00110=$0.00003546476364136^{10}$).

Addition of Terms

The three terms are added in adder 122 to generate preliminary sum PS[3:-25]. A text book addition for the example values provided above is as follows.

$a^{-1}$    0001.01110,00000,10111,00000,10000
$-a^{-2}$ (x-a)  1111.11111,11000,10100,11100,10111
$a^{-3}$ (x-a)² +0000.00000,00000,00001,00101,00110
PS[3:-25]  0001.01101,11001,01101,00010,01101

Normalizer 130 uses the lower three bits PS[-23:-25] to round bit PS[-22], and a right shift occurs. The resulting bits that have weights less than unity form the reciprocated mantissa R[-1:-23] (e.g., 0.10110,11100,10110,10001,010= $0.7155315876007_{10}$). Normalizer generates a binary one carry out bit "c" to increment the exponent to compensate for the right shift.

Exponent

The reciprocal of the exponent is the negative of the exponent. However, a binary one value must be added to the negated exponent to account for the right shift of the mantissa. Accordingly, exponent unit 140 inverts all bits x[7:0], increments once to obtain -x[7:0], and increments once again in response to signal "c" to compensate for the right shift in the mantissa to obtain reciprocated exponent bits R[7:0] (e.g., 100,10101=$-107^{10}$) representing the exponent of the value "x" in two's complement format.

Sign

Reciprocating a number does not change its sign. Thus, the sign bit R[8] representing the sign of the reciprocated value is made equal to the sign bit x[8] of the input value "x".

Thus, reciprocal approximating circuit 100 approximates the reciprocal of $x[8:-23]$ to be $R[8:-23]$ (e.g., approximates the reciprocal of positive $0.6987812519073 \times 2^{108}$ to be positive $0.7155315876007 \times 2^{-107}$). The correct reciprocal to 13 digits of base ten precision is $0.7155315037936 \times 10^{-107}$. Thus, the mantissa is accurate to 6 or 7 base ten digits of precision.

Approximation circuit 100 is quite fast because look-up tables 102, 104 and 106 take little time to generate bits representing f(a), f'(a) and (½) f"(a), respectively. Two relatively fast floating point multipliers 114 and 116 multiply terms in parallel. Normalization in normalizer 130 and determination of the reciprocated exponent in exponent unit 140 are also quite efficient. On the other hand, conventional squaring circuits are typically slower than look-up tables.

Squaring Circuit 108

Squaring circuit 108 may be a novel squaring circuit such as that disclosed in co-pending United States patent application Ser. No. 09/138,301 filed Aug. 21, 1998, entitled "A Circuit and Method for Fast Squaring by Breaking the Square into a Plurality of Terms", which is incorporated herein by reference in its entirety.

Figure 2:
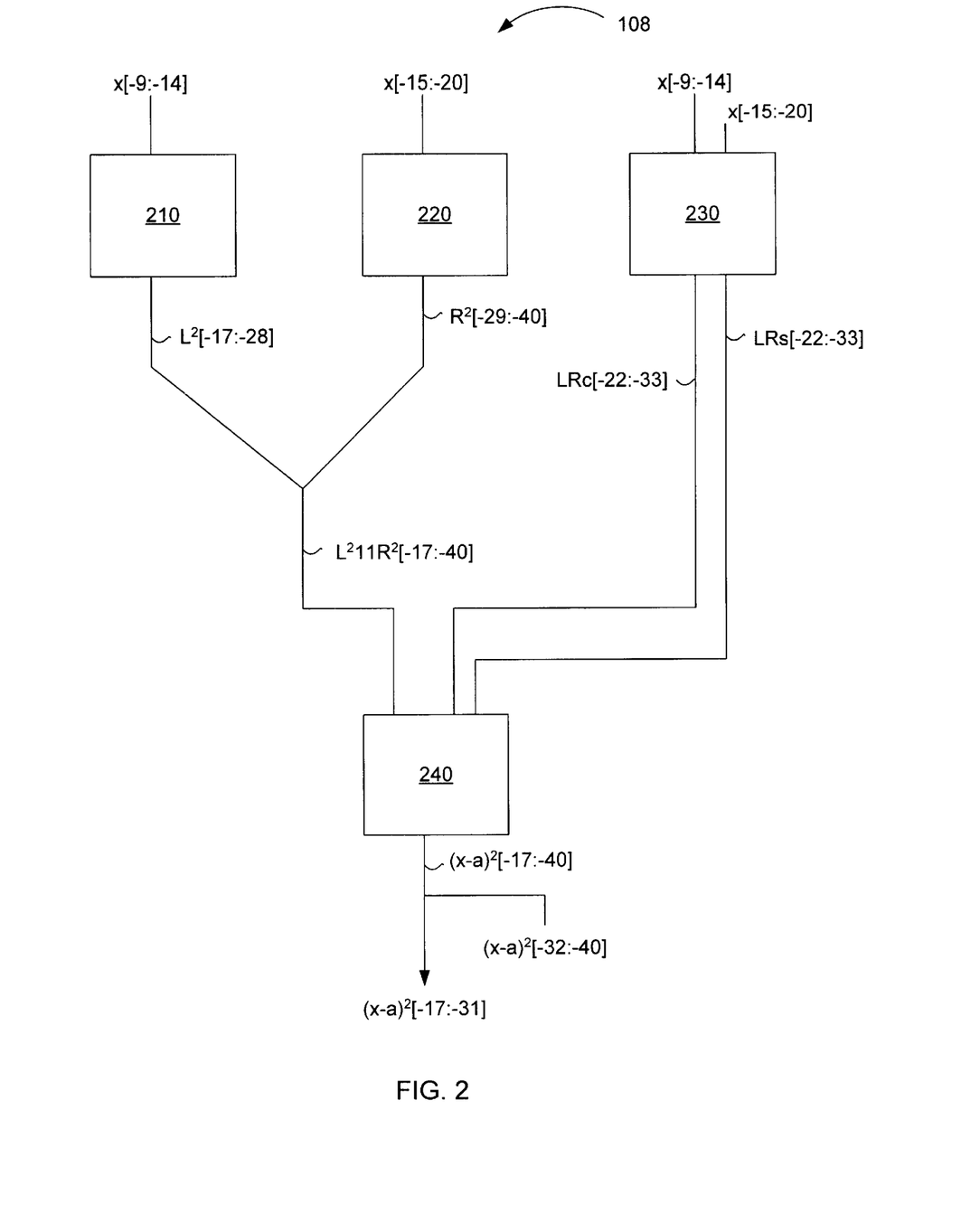
FIG. 2 is a diagram of the squaring circuit of FIG. 1.

FIG. 2 is a detailed block diagram of squaring circuit 108 of FIG. 1. Squaring circuit 108 receives bits x[-9:-20], of which left hand squaring circuit 210 receives bits x[-9:-14] (e.g., .***,*11,1000=$0.00341796875_{10}$), right hand squaring circuit 220 receives bits x[-15:-20] (e.g., .***,*,****1,10101=$0.00005054473876953_{10}$), and multiplier 230 receives all bits x[-9:-20].

Squaring circuit 210 generates bits $L^2[-17:-28]$ (e.g., .***,*,***,*1100,01000,000=$0.000011682$ $51037598_{10}$) representing the square of value x[-9:-14]. Squaring circuit 220 generates bits $R^2[-29:-40]$ (e.g., .***,*,*,*,,*10,10111, 11001=$0.00000000255477061728_{10}$) representing the square of value x[-15:-20]. The two values $L^2[-17:-28]$ and $R^2[-29:-40]$ are concatenated to form concatenated bits $L^2O(R^2[-17:-40]$ (e.g., .***,*,***,*1100,01000, 00010,10111,11001=$0.00001168506514659_{10}$).

Multiplier 230 performs a multiplication of the values represented by bits x[-9:-14] and bits x[-15:-20] by, for example, a conventional "Wallace Tree" technique, and performs a left shift to generate bits LRs[-22:-33] (sum term) and LRc[-22:-33] (carry term). Together, the terms LRs[-22:-33] and Lrc[-22:-33] represent twice the product of x[-9:-14] and x[-15:-20] (e.g., in the exemplary embodiment, the sum of LRs[-22:-33] and LRc[-22:-33] should be .**,****,**,*1011,10011,000= $0.00000034552067518 23^{10}$).

Squaring circuit 108 is faster than conventional squaring circuits and generates a square about the same time as the look-up tables 102, 104 and 106 generate results.

3:1 adder 240 adds values $L^2||R^2[-17:-40]$ LRs[-22:-33] and LRc[-22:-33] (with appropriate extensions to match weights) to obtain the square $[(x-a)^2][-17:-40]$ .***, *,***,*1100,10011,10101,10111,11001= $0.00001203058582178_{10}$). The nine least significant bits of $[(x-a)^2][-17:-40]$ are discarded so that squaring circuit 108 outputs bits $[(x-a)^2][-17:-31]$ Although the above approximation circuit is described as approximating a reciprocal of the input value "x", one skilled in the art will recognize that approximation circuit 100 may estimate any function (e.g., $x^{-3}$, $x^{1/2}$) of input value "x" by using different entries in the look-up tables 102, 104 and 106.

Although the first three terms of a Taylor series are used above, approximation circuit 100 may also only calculate and add the first two terms of the series. In this case, LUT 106, squaring circuit 108, and multiplier 116 are not used.

The above describes reciprocal approximation using Taylor series constants $a^{-1}$, $-a^{-2}$ and $a^{-3}$. However, note that the values (hereinafter, $K_1$, $K_2$ and $K_3$) stored for $a^{-1}$, $-a^{-2}$ and a in LUT 102, LUT 104 and LUT 106 differ from the best representable approximation of the values $a^{-1}$, $-a^{-2}$ and $a^{-3}$, respectively. As an illustration, in the above example, approximation value "a" is 0.10110,010 ($0.6953125_{10}$). The actual value for $a^{-1}$ to 13 significant digits is 1.438202247191. The binary value $K_1$ stored in LUT 102 for $a^{-1}$ is 1.01110,00000,10111,00000,10000 ($1.438202381134_{10}$). However, the binary value 1.01110,00000,10111,00000,01100 ($1.438202261925_{10}$) is closer to the actual value for $a^{-1}$.

For reciprocal approximation using approximation circuit 100, the accuracy of the final result R[8:−23] is improved by one or two digits of precision if the constants $K_1$, $K_2$ and $K_3$ stored in LUT 102, LUT 104 and LUT 106 are perturbed slightly from the best approximation of the Taylor series constants $a^{-1}$, $a^{-2}$, and $a^{-3}$, respectively. For some functions, the variance from the Taylor series constants may be significant.

For each possible approximation value "a", the values $K_1$, $K_2$ and $K_3$ were varied with the aim of maximizing the accuracy of the result R[8:−23] within the whole range of input values "x" represented by that approximation value "a".

For example, all input values "x" from 0.5 to 0.50390624 are approximated with approximation value 0.5. When the input value "x" is relatively close to approximation value "a", the first three terms of the Taylor series would give a fairly accurate result R[8:−23]. However, if the input value "x" is towards the upper limit of the range, 0.50390624, the result R[8:−23] is much less precise if accurate Taylor constants are used. Thus, to reduce the maximum error within the range of 0.5 to 0.50390624, constants $K_1$, $K_2$ and $K_3$ located within look-up tables 102, 104 and 106 are chosen to be other than the constants $a^{-1}$, $-a^{-2}$ and $a^{-3}$ expected under a pure Taylor series. For example, $K_1$ may be 2.000001 hexadecimal (2.000000059605) instead of 2, $K_2$ may be FC.000A hexadecimal (−3.999847412109) instead of −4, and $K_3$ may be 7.E800 hexadecimal (7.90625) instead of 8. These values were obtained by simulating the approximation circuit 100 described above for many candidate values of $K_1$, $K_2$ and $K_3$ and varying "x" within the range of 0.5 to 0.50390624 in order to find the values of $K_1$, $K_2$ and $K_3$ that minimize the maximum approximation error within that range. This custom selection of the constants $K_1$, $K_2$ and $K_3$ for each range of x allows for precision of 1 or 2 bits of precision more accurate than obtainable by using the values of the Taylor series constants $a^{-1}$, $-a^{-2}$ and $a^{-3}$.

Values for $K_1$, $K_2$ and $K_3$ found to maximize accuracy for each approximation value "a" are shown respectively in FIG. 3, FIG. 4 and FIG. 5. Approximation values "a" are shown to the right of ",//" for each column. Input value "a" of 0.10000,000 is represented by term 0x00, 0.10000,001 is represented by term 0x01 and so forth until 0.11111,111 is represented by term 0x7F. The value to the left of ",//" represents the look-up table values.

In FIG. 3, 0x002000001 represents 2.000001 hexadecimal ($2.000000059605_{10}$) which is the value $K_1$ in LUT 102 for an approximation value "a" of 0.10000,000. Thus, the values to the left of ",//" in FIG. 3 have a least significant hexadecimal digit of weight $2^{-24}$.

In FIG. 4, 0xfffc000a is a hexadecimal representation, in two's complement format, of $K_2$ for an approximation value "a" of 0.10000,000. The least significant hexadecimal bit has a weight $2^{-16}$. Thus 0xfffc00a represents two's complement binary 100.00000,00000,00101,0 ($-3.999847412109^{10}$).

In FIG. 5, 0xfd0 is a hexadecimal representation of $K_3$ for an approximation value "a" of 0.10000,000. The least significant hexadecimal bit has a weight $2^{-9}$. Thus 0xfd0 represents binary 111.11101,0000 ($7.90625_{10}$).

The embodiments described above are illustrative only and not limiting. In light of this disclosure, various substitutions and modifications will be apparent to one of ordinary skill. Therefore, the present invention is defined by the following claims.

We claim:

1. A method of providing a circuit comprising:

providing a first look-up table configured to receive an approximation value "a", the first look-up table configured to generate a function f(a) of the approximation value "a", wherein the approximation value "a" approximates an input value "x";

providing a second look-up table configured to receive at least a relevant portion of the approximation value "a", the second look-up table configured to generate a first derivative f'(a) of the function of the function f(a);

providing a multiplier configured to receive the first derivative f'(a) and a difference (x−a) between the input value "x" and the approximation value "a", the multiplier configured to generate a product of the first derivative f'(a) and the difference (x−a) in parallel with the generation of function f(a);

providing an adder configured to receive the function f(a) and the product;

providing a third look-up table configured to receive at least a portion of the approximation value "a", the third look-up table configured to generate a second derivative f'(a) of the function f(a);

providing a squaring circuit configured to receive at least a portion of the difference (x−a), the squaring circuit configured to generate a square $(x-a)^2$ of the difference (x−a); and a second multiplier configured to receive and multiply one half of the second derivative f"(a) and the square $(x-a)^2$ to generate a second product in parallel with the first product and function f(a).

2. The method of claim 1, wherein the providing a squaring circuit comprises:

splitting an input bit group representing an input value into left and right hand portions representing respective left and right hand values, wherein the input bit group comprises the at least a portion of the difference (x−a);

generating a first term bit group representing a square of the left hand value;

generating a second term bit group representing a product of the left and right hand values;

generating a third term bit group representing a square of the right hand value;

concatenating the first and third term bit groups to provide a concatenated bit group; and adding the concatenated bit group and the second term bit group, left shifted by n+1 bit positions, to generate an output bit group representing a square $(x-a)^2$ of the difference (x−a).

3. A method of using a circuit comprising:

generating a function f(a) of an approximation value "a" with a first look-up table, the approximation value "a" being an approximation of an input value "x";

generating a first derivative f'(a) of the function f(a) with a second look-up table;

receiving the first derivative f'(a) and a difference (x−a) between the input value "x" and the approximation value "a";

generating a product of the first derivative f'(a) and the difference (x−a) with a multiplier in parallel with the generation of the function f(a);

receiving the function and the product in an adder; and generating one half of a second derivative f"(a) of the function f(a) in a third look-up table.

4. The method of claim 3, wherein the multiplier is a first multiplier and wherein the product is a first product, the method further comprising:

generating a square $(x-a)^2$ of the difference (x−a) in a squaring circuit; and generating a second product of the one half of the second derivative f"(a) and the square $(x-a)^2$ in a second multiplier.

5. The method of claim 4 further comprising:

receiving the second product in the adder; and adding the function f(a), the first product, and the second product in the adder to generate an approximation of the function f(x) of the input value "x".

6. The method of claim 5, further comprising:

shifting the approximation in a normalization circuit so that the approximation represents a mantissa within a predetermined range; and receiving an exponent of the input value in an exponent circuit;

negating the exponent in the exponent circuit to generate a negated exponent; and incrementing the negated exponent to compensate for the shifting of the approximation.

7. The method of claim 3, wherein:

the function is a reciprocal $a^{-1}$ of the approximation value "a".

8. An approximation circuit, comprising:

first look-up table configured to receive an approximation value "a", the first look-up table configured to generate a function f(a) of the approximation value "a", wherein the approximation value "a" approximates an input value "x"

a second look-up table configured to receive at least a portion of the approximation value "a", the second look-up table configured to generate a first derivative f'(a) of the function f(a);

a multiplier configured to receive the first derivative f'(a) and a difference (x−a) between the input value "x" and the approximation value "a", the multiplier configured to generate a product of the first derivative f'(a) and (x−a);

a third look-up table configured to receive at least a portion of the approximation value "a", the third look-up table configured to generate a second derivative f"(a) of the function f(a);

a squaring circuit configured to receive at least a portion of (x−a), the squaring circuit configured to generate a square $(x-a)^2$ of (x−a);

a second multiplier configured to receive and multiply one-half of the second derivative f"(a) and the square $(x-a)^2$ to generate a second product in parallel with the generation of f(a) and the first derivative f'(a); and an adder configured to generate an approximation of the function f(x) in response to the function f(a), the first product and the second product.

9. The circuit of claim 8, further comprising:

a normalization circuit configured to shift the approximation to represent a mantissa within a predetermined range; and an exponent circuit configured to receive an exponent of the input value, the exponent circuit configured to negate the exponent and compensate for the shift of the approximation.

10. The circuit of claim 8, wherein the squaring circuit further comprises:

an input terminal configured to carry a k-bit input bit group representing a k-bit input value, the input bit group having a left hand m-bit portion and a right hand (k−m)-bit portion representing respective left and right hand values, wherein the k-bit input bit group comprises the at least a portion of the difference (x−a);

a left hand squaring circuit configured to receive the left hand m-bit portion and generate a first term bit group representing a square of the left hand value;

a multiplier configured to multiply the left hand m-bit portion and the right hand (k−m)-bit portion and the right hand (k−m)-bit portion and generate a second term bit group representing a product of the left and right hand values;

a right hand squaring circuit configured to receive the right hand (k−m)-bit portion and generate a third term bit group representing a square of the right hand value; and an adder configured to add the second term bit group, left shifted by k−m+1 bit positions, to a concatenation of the first and third term bit groups, wherein the adder generates a square $(x-a)^2$ of the difference (x−a).

11. The circuit of claim 8, wherein the function f(x) is a reciprocal, and wherein the circuit is configured to approximate the reciprocal of x.

12. An approximation circuit, comprising:

a first look-up table configured to receive an approximation value "a", the first look-up table configured to generate a function f(a) of the approximation value "a", wherein the approximation value "a" approximates an input value "x"

a second look-up table configured to receive at least a portion of the approximation value "a", the second look-up table configured to generate a first derivative f'(a) of the function f(a);

a multiplier configured to receive the first derivative f'(a) and a difference (x−a) between the input value "x" and the approximation value "a", the multiplier configured to generate a product of the first derivative f'(a) and (x−a);

a third look-up table configured to receive at least a portion of the approximation value "a", the third look-up table configured to generate a second derivative f"(a) of the function f(a);

a squaring circuit configured to receive at least a portion of (x−a), the squaring circuit configured to generate a square $(x-a)^2$ of (x−a);

a second multiplier configured to receive and multiply one-half of the second derivative f"(a) and the square $(x-a)^2$ to generate a second product in parallel with the generation of f(a) and the first derivative f'(a); and an adder configured to singularly generate an approximation of the function f(x) in response to the function f(a), the first product and the second product; and a normalization circuit, coupled to the adder, configured to shift the approximation to represent a mantissa within a predetermined range.

* * * * *